United States Patent [19]

Rice

[11] Patent Number: 4,900,767

[45] Date of Patent: Feb. 13, 1990

[54] PROCESS FOR THE SURFACE MODIFICATION OF MINERALS IN A REACTIVE ATMOSPHERE

[75] Inventor: Camilla A. Rice, Sandersville, Ga.

[73] Assignee: E.C.C. America Inc., Atlanta, Ga.

[21] Appl. No.: 263,689

[22] Filed: Oct. 28, 1988

Related U.S. Application Data

[63] Continuation-in-part of Ser. No. 943,669, Dec. 17, 1986, Pat. No. 4,789,403, and a continuation-in-part of Ser. No. 175,868, Mar. 31, 1988, Pat. No. 4,859,718.

[51] Int. Cl.$^4$ .......................... C08K 9/04; C09C 3/08; B32B 5/16
[52] U.S. Cl. ..................................... 523/205; 523/209; 106/415; 106/416; 106/417; 106/465; 106/489; 428/404; 428/406; 428/407
[58] Field of Search ................ 523/205, 209; 106/415, 106/416, 417, 465, 489; 428/404, 406, 407

[56] References Cited

U.S. PATENT DOCUMENTS

| | | | |
|---|---|---|---|
| 3,773,708 | 11/1973 | Takahashi et al. | 523/209 |
| 4,472,538 | 9/1984 | Kamigaito et al. | 523/209 |
| 4,789,403 | 12/1988 | Rice | 106/417 |
| 4,798,766 | 1/1989 | Rice | 523/209 |

*Primary Examiner*—Lewis T. Jacobs
*Attorney, Agent, or Firm*—Klauber & Jackson

[57] ABSTRACT

A method of producing a mineral such as calcium carbonate, glass fibers and layered lattice silicates which is surface modified with an organic material wherein said mineral in substantially dry, particulate form is contacted with an organic monomer, co-monomers or a prepolymer, and surface polymerization or reaction in situ on the mineral is carried out in the presence of gaseous carbon monoxide.

31 Claims, 3 Drawing Sheets

HYDROUS KAOLIN REACTED WITH HEXANEDIAMINE AND ADIPIC ACID IN CO

PROCESS FOR THE SURFACE MODIFICATION OF MINERALS IN A REACTIVE ATMOSPHERE

RELATED APPLICATIONS

This application is a continuation-in-part of my co-pending applications, Ser. No. 943,669, filed Dec. 17, 1986, now U.S. Pat. No. 4,789,043, issued Dec. 6, 1988, and Ser. No. 175,868, filed Mar. 31, 1988 now U.S. Pat. No. 4,859,718, issued Aug. 22, 1989.

FIELD OF THE INVENTION

This invention relates generally to minerals such as calcium carbonate, glass fibers and siliceous minerals such as aluminosilicates and the like, and more specifically relates to a method for producing such a mineral which is surface modified with an organic material. The products comprise particles of the mineral, the surfaces of which are modified by a polymer.

BACKGROUND OF THE INVENTION

This specification will at times refer to "layered silicates." The layered silicates to which the invention is applicable are of the type which can be represented by the general formula $E_iM_xSi_yO_n(OH)_m$ where M is Al, Mg, or Fe, $x=2$ to 6; $y=2$ to 8, $n=2$ to 20, $m=0$ to 8, and $E_i$ is one or more exchangeable ions (K, Na, Mg, Ca, Ba, Fe, Li, etc.). These layered silicates will hereinafter in this specification be referred to as "layered lattice silicates".

It has been recognized that the surface treatment of substrates of the mineral or clay mineral type can be enhanced by carrying out the treatment with the use of hydrogen.

In one aspect, the reactants include organic compounds, polymer-forming compounds and the like and the reaction is carried out in the presence of hydrogen which activates or promotes the reaction, at elevated temperatures.

Since the reaction need only take place to a limited extent, viz., at the surface, without involving the bulk of the substrate, thus without problems of diffusion of reactants through already formed surface layers, such processes offer advantages in minimal consumption of materials and energy and in short reaction times as well as in providing a wide variety of structures at the surface. The products have advantages in possessing chemically modified surface properties making them useful for particular applications while retaining desirable physical properties of the bulk of the substrate.

Thus the surface treatment of a clay mineral such as kaolin with a polymerizable substance such as a nylon precursor may be carried out in the presence of hydrogen at elevated temperatures to form a polymer in situ at the surface of the kaolin, the product being useful as a filler in resins, elastomers and the like. Such a product is particularly advantageous as a filler in a matrix with which the treated kaolin surface is compatible or to which it is similar whereby better adhesion is achieved between the two.

It has also been recognized that a layered lattice silicate may be surface modified by a gas which enters directly into the reaction, e.g., $NH_3$.

In this disclosure the term "surface modified" means that only the surface of the substrate is modified and no breakdown of its structure other than that normally associated with heating in the range set forth herein, occurs.

In my U.S. Pat. No. 4,764,495, issued Aug. 16, 1988, there is disclosed a method for producing a layered lattice silicate which is surface modified with an organic material, by pretreating the silicate such as a kaolin in a hydrogen atmosphere, and then reacting the product with a suitable organic compound.

In my application U.S. Ser. No. 943,669, filed Dec. 17, 1986, U.S. Pat. No. 4,789,403, issued Dec. 6, 1988, there is disclosed a method for producing a layered lattice silicate which is surface modified with an organic material, by contacting the silicate such as a kaolin with an organic monomer, comonomers, or a prepolymer, and effecting surface polymerization or reaction in situ in the presence of a gaseous hydrogen atmosphere. It is believed that the polyamide (nylon) type polymers grow from the surface of the mineral which results from the exposure of the mineral surface to nylon type monomers/prepolymers; and that in the case of the other resins (ABS prepolymer, polybutadiene, polypropylene, polyethylene) the polymer resin is exposed to the mineral surface and becomes bonded to it.

In my copending application Ser. No. 175,868, U.S. Pat. No. 4,859,718, issued Aug. 22, 1989, there is disclosed a method for surface modifying with an organic material a carbonate such as calcium carbonate, which during processing has become coated with processing chemicals, wherein the carbonate in substantially dry, particulate form is contacted with an organic monomer, comonomers or a prepolymer, in the presence of gaseous hydrogen and a calcined kaolin or $TiO_2$ as a polymerization initiation catalyst.

My U.S. Pat. No. 4,690,868 teaches directly aminating the surface of a 2-dimensional layered lattice silicate comprising reacting the lattice silicate in particulate form with gaseous $NH_3$ at temperatures below 1000° C. to form bound $NH_2$ groups at the surface; the resulting modified 2-dimensional layered lattice silicate and a filled resin system employing the thusly modified silicate.

In may application U.S. Ser. No. 089,510, filed Aug. 26, 1987, U.S. Pat. No. 4,798,766, issued Jan. 17, 1989, a method is described for producing a layered lattice silicate which is surface modified with an organic material, which comprises reacting a layered lattice silicate in particulate form with a reactant system comprising gaseous $NH_3$ at temperatures below about 1000° C. to form bound $NH_2$ groups at said surface, and reacting the aminated silicate in particulate form in the presence of gaseous hydrogen with an organic compound selected from the class consisting of monomers, comonomers, and prepolymers, which are condensible with the amine group.

An object of this invention is to make improvements in the surface treatment of minerals in the presence of an activating or promoter gas.

SUMMARY OF THE INVENTION

It has now been found that, as an improvement to using $H_2$ as a reactive atmosphere to initiate in situ polymerization and subsequent bonding of the formed polymer to a mineral surface, the reaction occurs more rapidly (at least five times faster) in the presence of CO with more surface bonds being formed. This new method has the advantage of time and efficiency over $H_2$-promoted reactions. Metacresol extraction and infrared analysis of the surfaces after extraction show that, where a nylon precursor is used, the nylon is bonded to the surface and bonding occurs through the CO sites in the amide.

Surprisingly it has been found that reactions in CO are extremely rapid compared with $H_2$, less than one minute being required to complete a reaction in CO that takes 15 to 20 minutes in $H_2$. Clearly this is a major improvement with respect to time, energy, economic use of equipment, manpower, etc.

Now in accordance with the present invention, the foregoing object, and others as will become apparent in the course of the ensuing specification, are achieved in a method of treating a mineral selected from the group consisting of metal carbonates, glass fibers and layered lattice silicates so that the mineral becomes surface modified with an organic material. The metal carbonate may be selected from the group consisting of calcium carbonate, magnesium carbonate and calcium-magnesium carbonate. According to the invention, the mineral substrate, which is in substantially dry particulate form, is contacted with an organic monomer, co-monomers, or a prepolymer, viz., not fully polymerized to its highest molecular weight range, and surface polymerization or reaction is effected in the presence of CO. The level of addition of the monomers/prepolymers may suitably be in the range of about 0.25 weight percent to about 10 weight percent based on the weight of the substrate. The starting material, which may be a layered lattice silicate such as a refined kaolin, is initially thoroughly dried and blended with a solid or liquid monomer (or, as mentioned, co-monomers or a prepolymer), as for example, by milling of the dry kaolin and a dry monomer in a suitable mill, which may also be screened. The resulting powder is thereupon provided in a suitable reactor, which has previously been heated to an intermediate temperature, for example, 100° C. The reactor is flushed with nitrogen to remove residual oxygen and thereupon a flow of carbon monoxide is substituted for the nitrogen. The CO need not be pure and may contain inert constituents such as nitrogen, helium or argon. The CO may range from 100% to 10% in the mixture. Heat is then provided to increase the temperature to at least the melting point of the monomer, but insufficient to volatilize the monomer, while the CO-containing atmosphere is maintained. The temperature may range from about 110° C. to about 300° C. depending upon the organic system used.

The said reaction may be conducted in apparatus which provides good gas-solids contact, such as a rotary furnace. The said reaction may also be conducted in a fluidized bed reactor, with the gaseous components passing upwardly through a suitable diffuser plate, and into a fluidized bed of the particulate material being treated. Typical reaction times are from 0.5 minutes to 30 minutes. Reaction times longer than 30 minutes cause discolored products and do not enhance the product characteristics.

Various layered lattice silicates, including minerals comprising same, may be treated by the method of the invention. Thus, for example, clays of the halloysite, illite, kaolinite, montmorillonite, palygorskite groups, talc and various other clays, can be readily treated by the present invention. Hydrous or calcined kaolins may be used. However, where hydrous kaolins are treated which as a result of aqueous processing with dispersants may have their sites which are activated by the CO covered as to render the kaolin inactive, a polymerization initiation catalyst, preferably a calcined kaolin or $TiO_2$, should be present where polymerization occurs from monomers. Minerals, e.g., calcium carbonate and glass fibers may also serve as the substrate.

With respect to kaolin terminology, it is noted that the prior art literature, including numerous of the prior art patents relating to the field of kaolin products and processing, commonly uses the term "hydrous" to refer to a kaolin which has not been subjected to calcination—more specifically, which has not been subjected to temperatures above about 450° C., which temperatures serve to alter the basic crystal structure of kaolin. These so-called "hydrous" clays may have been produced from crude kaolins, which have been subjected to beneficiation, as, for example, to froth flotation, to magnetic separation, to mechanical delamination, grinding, or similar comminution, but not to the mentioned heating as would impair the crystal structure. The description of these materials as "hydrous" is actually somewhat inaccurate, since there is no molecular water actually present in the kaolinite structure. Thus, although the composition can be (and often is) arbitrarily written in the form $2H_2O.Al_2O_3.2SiO_2$, it is now well-known that kaolinite is an aluminum hydroxide silicate of approximate composition $Al_2(OH)_4Si_2O_5$ (which equates to the hydrated formula formula just cited). Once the kaolin is subjected to calcination, which, for the purposes of this specification means being subjected to heating of 450° C. or higher for a period which eliminates the hydroxyl groups, the crystalline structure of the kaolinite is destroyed. In any event, in order to maintain consistency with the prior art terminology, the terms "hydrous kaolin" and "calcined kaolins" are used in this specification in the commonly understood prior art senses just indicated.

It may further be noted that in many instances particulate calcium carbonate may be the product of "wet processing" or "wet grinding." U.S. Pat. No. 3,980,240, for example, describes such a product by processing of a calcitic ore. In the procedure described in said patent, a dispersing agent is used during ball milling in order to facilitate grinding—in this instance Dispex N40, a trademark of Allied Colloids for a sodium polyacrylate composition. By contrast, a dry ground or dry processed carbonate is one which has been ground in dry condition without the use of dispersants. Further discussion of dry ground and wet processed calcium carbonates may be found in U.S. Pat. No. 3,604,634.

As is set forth in my copending application Ser. No. 175,868, where the carbonate has been subjected to wet processing, i.e., has been ground in an aqueous slurry containing a dispersing agent, a problem that arises is that the dispersing agent covers the active sites resulting from the use of hydrogen and renders the carbonate inactive. In that case an initiation catalyst is needed during the activation with hydrogen gas, viz., a minor amount, generally less than 1%, e.g., of the order of 0.25 to 0.5 weight percent based on the weight of the carbonate on a dry basis, of a calcined kaolin or titanium dioxide, the calcined kaolin being preferred. Similar considerations apply to the present invention, where the same polymerization initiation catalysts are appropriate where wet processed carbonates are treated pursuant to the invention, and where polymerization occurs from monomers.

It is known that glass fibers are used commercially to produce fabrics and insulation. When the starting material in this invention is glass fibers, they may be used as subdivided fibers, as the fibers themselves or as yarn or textiles comprising the glass fibers, for carrying out the surface treatment according to the invention.

A large variety of organic monomers may be used in the process of the invention: For example, E-caprolactam or alternatively 6-amino caproic acid, to produce nylon 6; hexamethylene diammonium adipate or the comonomers hexamethylene diamine and adipic acid, to form nylon 6,6; the corresponding monomer from hexamethylene diamine and sebacic acid or the co-monomers, to form nylon 6,10; and the lactam of heptanoic acid to form nylon 7. It will be apparent that other monomers, comonomers or prepolymers may be used to produce various nylon types. Acrylates such as methyl methacrylate may be used. In addition, other types of prepolymers (e.g. ABS (acrylonitrile-butadiene-styrene) prepolymer, hydrocarbon prepolymers such as polybutadiene, polypropylene, polyethylene) are capable of being reacted in situ on the mineral, to make the latter useful as fillers for polymer matrices, in particular matrices of the same polymer as that deposited on the mineral. Similarly, the in situ formed polymer need not be identical to the matrix polymer, provided that the two are compatible.

The invention will now be illustrated by the Examples, which, however, are to be considered as merely exemplary of practice of the invention, and not as delimitive thereof.

EXAMPLE 1

A sample of Whitetex (a PRP [paint, rubber, plastic]-grade calcined kaolin available from Engelhard Corporation) was mixed with 0.75% 11-aminoundecanoic acid. The mixture was screw fed into a rotary furnace heated to 200° C. (The furnace was operating at maximum tilt (3°) and rotation speed.) The sample was reacted in a 1:3 $CO/N_2$ atmosphere operating at a flow rate of 20 SCFH. The reacted product was characterized by drift spectra which revealed the formation of amide bonds in the 3400 $cm^{-1}$ and 1600 $cm^{-1}$ range. The product was extremely hydrophobic and would not disperse in water. (Whitetex is easily dispersed in water.)

EXAMPLE 2

Figure 1:
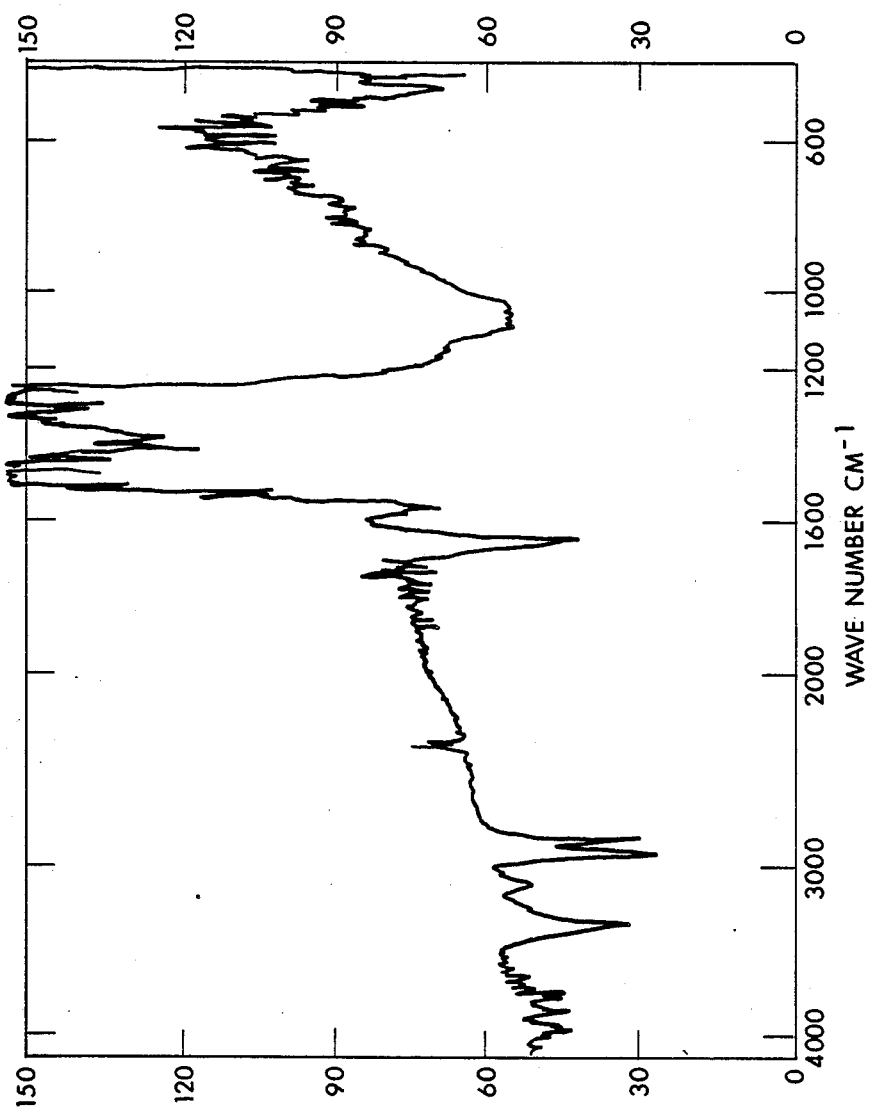
FIG. 1 shows the infrared drift spectra for a sample of glass fibers reacted in accordance with the invention with 2% by weight of 11-aminoundecanoic acid in a $CO/N_2$ atmosphere.

A sample of Dow Corning chopped fiber glass was mixed with 2% 11-aminoundecanoic acid and reacted for 10 minutes at 200° C. in a 1:3 $CO/N_2$ atmosphere in a vibrating fluid bed reactor fitted with a shaved screw diffuser plate. The infrared spectra of the reacted glass fibers exhibited amide bonds in the drift spectra indicative of the formation of nylon 11 on the glass surface, see FIG. 1.

EXAMPLE 3

Figure 2:
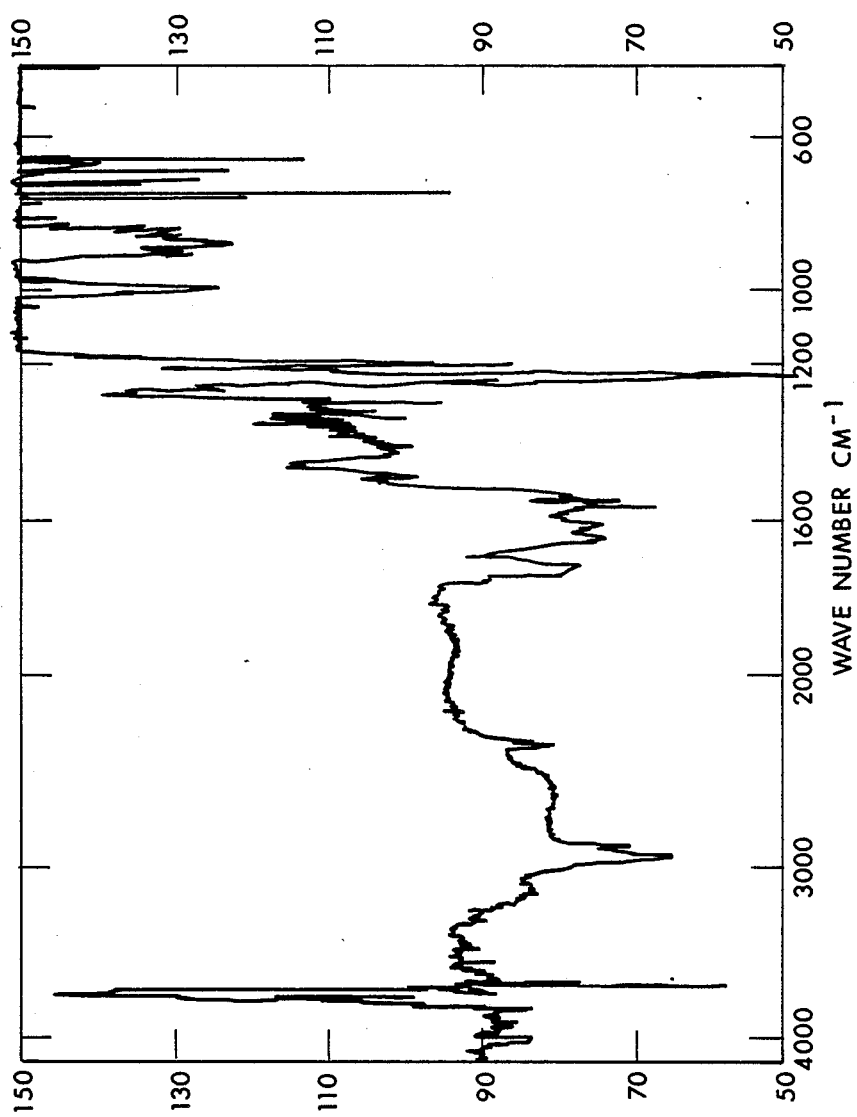
FIG. 2 shows the infrared spectra for a sample of hydrous kaolin reacted in accordance with the invention with nylon 6,6-forming co-monomers, viz., hexanediamine and adipic acid.
Figure 3:
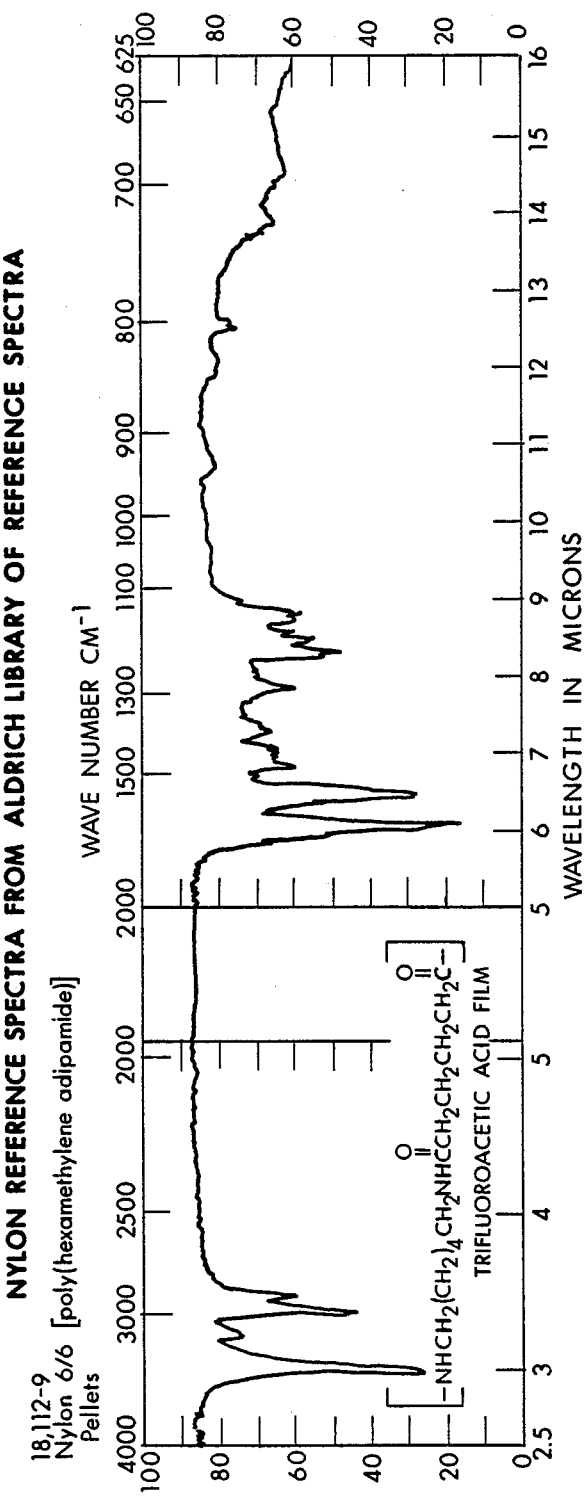
FIG. 3 shows the reference infrared spectra known in the literature (taken from the Aldrich Library of Reference Spectra) for nylon 6,6 [poly(hexamethylene adipamide)]pellets.

200 grams of dried (at 150° C. for 2 hours) hydrous kaolin, having a psd (particle size distribution) of 100% less than 1u, was milled with 0.6% adipic acid, 0.48% hexanediamine and 0.5% Cattex (a calcined kaolin catalyst available from Anglo-American Clays Corporation). The milled kaolin mixture was placed in a vibrating fluidized bed reactor heated to 150° C. The reactor was flushed with $N_2$ gas for 5 minutes to remove oxygen from the system. The temperature of the reactor was increased to 230° C. at which time carbon monoxide was added to the gas flow to achieve a 1:3 mixture of $CO/N_2$; the total flow rate was 15 SCFH. The reaction was allowed to continue for 10 minutes in the $CO/N_2$ environment. At the end of 10 minutes, the CO was discontinued and the reaction vessel cooled to room temperature. The surface treated product was removed and analyzed by infrared spectral analysis for the formation of amide bonds in the 3400 $cm^{-1}$ and 1600 $cm^{-1}$ regions. Both sets were clearly visible, see attached infrared spectra of FIG. 2 and reference nylon spectra of FIG. 3.

In order to assess the nature of the surface, a small sample of the nylon 6,6 treated kaolin product was extracted for 2 hours, with stirring, in metacresol (metacresol will dissolve nylon that is coating the surface but will not remove surface attached/bonded nylon). The product after metacresol extraction was washed with water and oven dried. IR analysis showed a decrease in the amide bonds but a large proportion of the nylon surface was intact. Analysis of the bond position of the carbonyl bond in the surface nylon showed a 20 $cm^{-1}$ shift from the carbonyl bond position of the reference nylon. This shift is indicative of surface bonding of the nylon through the carbonyl group in the amide. No shift was observed for the amine bond.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A method of producing a mineral selected from the group consisting of metal carbonates, glass fibers and layered lattice silicates which is surface modified with an organic material, wherein the mineral in substantially dry, particulate form is contacted with an organic monomer, co-monomers, or a prepolymer, in the presence of gaseous carbon monoxide.

2. A method in accordance with claim 1 in which said mineral is glass fibers.

3. A method in accordance with claim 1, in which said mineral is a hydrous kaolin or a calcined kaolin.

4. A method in accordance with claim 3, in which said kaolin is hydrous and an initiation catalyst is present.

5. A method in accordance with claim 1, in which said mineral is a mica.

6. A method in accordance with claim 1, in which said mineral is a talc.

7. A method in accordnace with claim 1, in which said mineral is a bentonite.

8. A method in accordance with claim 1, in which said mineral is calcium carbonate.

9. A method in accordance with claim 1, in which said mineral is a metal carbonate which during its prior processing has become coated with processing chemicals; and wherein the contact with said carbon monoxide is in the presence of a calcined kaolin or $TiO_2$ as a polymerization initiation catalyst.

10. A method in accordance with claim 1, in which a prepolymer of acrylonitrile/butadiene/styrene is used.

11. A method in accordance with claim 1 in which a monomer selected from the group consisting of 6-amino caproic acid, E-caprolactam and 11-aminoundecanoic acid is used.

12. A method in accordance with claim 1 in which co-monomers comprising hexamethylene diamine and adipic acid are used.

13. A method in accordance with claim 1 or 3 in which the carbon monoxide is diluted with an inert gas and the mixture contains at least 10% carbon monoxide.

14. A method of producing glass fibers which are surface modified with an organic material, wherein the fibers are contacted with an organic monomer, comonomers, or a prepolymer, in the presence of carbon monoxide.

15. A particulate mineral selected from the group consisting of metal carbonates, glass fibers and layered lattice silicates comprising particles of said mineral, the surfaces of which have been modified by a polymer synthesized in situ in the presence of gaseous carbon monoxide or by reacting a prepolymer in situ on the mineral in the presence of gaseous carbon monoxide.

16. The composition of claim 15 in which the mineral is glass fibers.

17. The composition of claim 15, in which said layered lattice silicate is a hydrous kaolin or a calcined kaolin.

18. The composition of claim 15 in which said layered lattice silicate is a mica.

19. The composition of claim 15, in which said layered lattice silicate is a talc.

20. The composition of claim 15, in which said layered lattice silicate is a bentonite.

21. The composition of claim 15, in which said metal carbonate is calcium carbonate.

22. A composition comprising a filled polymer system comprising a matrix polymer and a filler, said filler comprising particles of a mineral selected from the group consisting of metal carbonates, glass fibers and layered lattice silicates the surfaces of which have been modified by a polymer synthesized in situ on the mineral in the presence of gaseous carbon monoxide.

23. A composition according to claim 22 in which the in situ synthesized polymer is essentially the same as the matrix polymer.

24. A composition according to claim 22, in which the in situ synthesized polymer is compatible with the matrix polymer.

25. A composition according to claim 22, in which the in situ synthesized polymer is a polyamide.

26. A composition according to claim 22, in which the layered lattice silicate is a kaolin.

27. A composition according to claim 22, in which the layered lattice silicate is a mica.

28. A composition according to claim 22, in which the layered lattice silicate is a talc.

29. A composition according to claim 22, in which the layered lattice silicate is a bentonite.

30. A composition according to claim 22, in which the metal carbonate is calcium carbonate.

31. A composition comprising a filled polymer system comprising a matrix polymer and a filler, said filler comprising particles of a mineral selected from the group consisting of metal carbonates, glass fibers and layered lattice silicates the surfaces of which have been modified by reacting a prepolymer in situ on the mineral in the presence of gaseous carbon monoxide.

* * * * *